Patented Apr. 10, 1923.

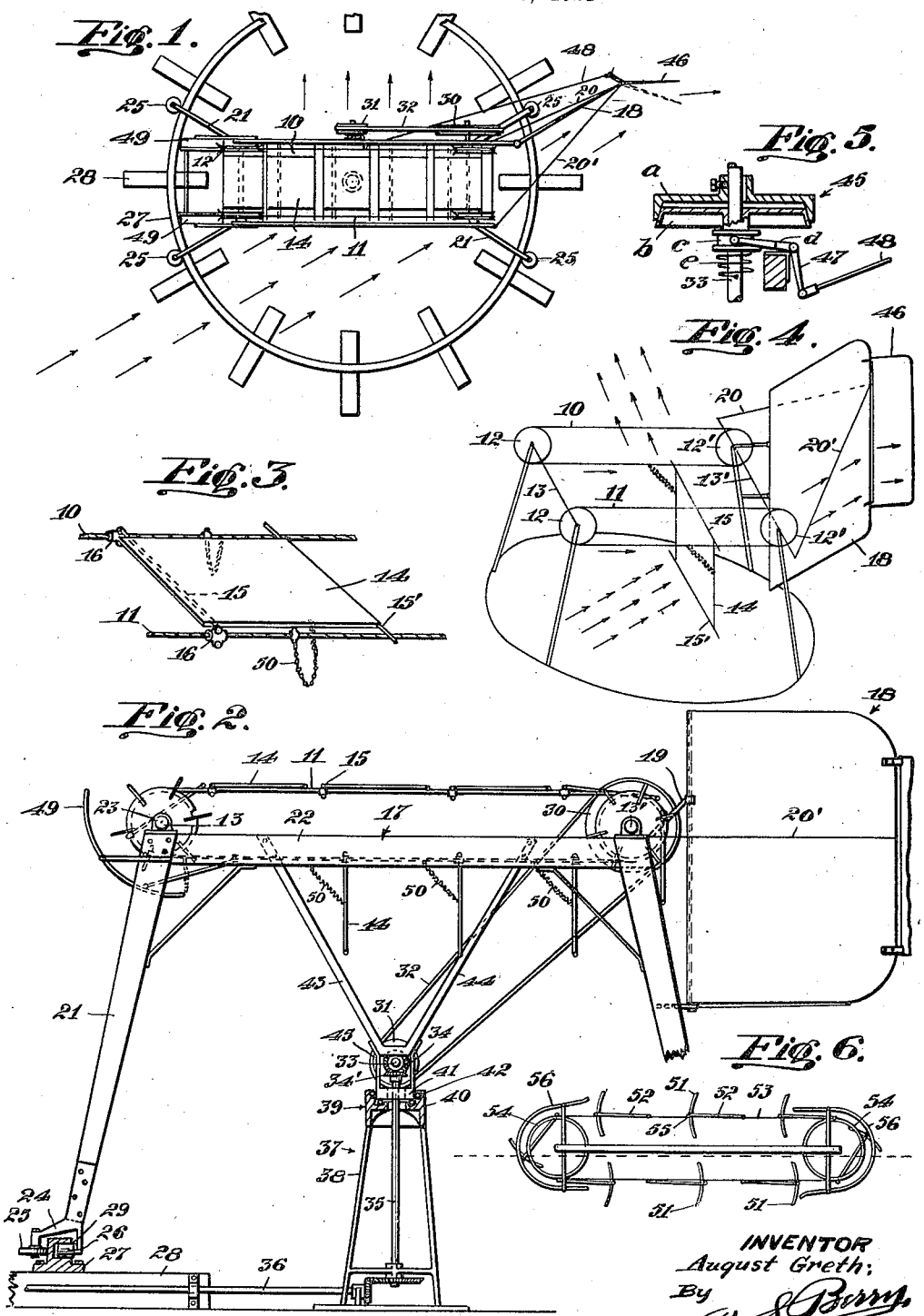

1,451,298

UNITED STATES PATENT OFFICE.

AUGUST GRETH, OF LOS ANGELES, CALIFORNIA.

WINDMILL.

Application filed March 24, 1921. Serial No. 455,226.

*To all whom it may concern:*

Be it known that I, AUGUST GRETH, a citizen of the United States, residing at Los Angeles, in the county of Los Angeles and State of California, have invented new and useful Improvements in Windmills, of which the following is a specification.

This invention relates to current motor and particularly pertains to a current motor having a plurality of vanes carried upon a continuous conveyor and adapted to be maintained at an angle to a current of air or water.

An object of the invention is to provide a current motor of the above type that may be employed for utilizing natural fluid currents for imparting power to a rotating shaft.

It is found in practise that when a vane, sail or similar device, acted upon by a flow of air or water, is disposed transversely across a current only a small portion of the available kinetic energy is converted into power inasmuch as a conical stratum of the fluid builds upon the vane causing the moving current to readily pass the sail or vane without being fully utilized in propeling it.

It is an object of this invention to provide a current motor of the above character embodying a plurality of vanes controlled by a rudder so that they are always disposed at an angle to the current other than a right angle so that the direction of flow of the fluid is changed and a higher percentage of the available kinetic energy of the current is utilized.

Other objects will appear hereinafter.

The invention is illustrated by the accompanying figures, in which:

Figure 1 is a plan view of a current motor particularly adapted for developing power from air currents.

Figure 2 is a view in side elevation therof.

Figure 3 is a detail view in perspective of one of the vanes of the current motor.

Figure 4 is a diagrammatic perspective of the current motor illustrating the course of the air currents relative to the vanes.

Figure 5 is a detail view in section of a clutch used in combination with the current motor to carry out one of the purposes of this invention; and Figure 6 is a view in end elevation of a modification of the invention particularly adapted for developing power from streams.

More specifically with reference to Figures 1 to 4 inclusive; 10 and 11 indicate two parallel endless cables spaced apart a suitable distance and each passing over a pair of pulleys 12—12'. The pulleys 12 are fixed on a shaft 13 and the pulleys 12' are fixed on a shaft 13'.

As a means for arresting and diverting the air currents to develop power a plurality of vanes 14, are provided which may be of any suitable construction but are preferably formed of metal sheets and are mounted on transverse bars 15 rotatably supported at their ends in yokes 16 clamped to the cables 10—11 so that the vanes are carried jointly by the two cables and supported at right angles thereto. A transverse bar 15' is mounted on the outer end of each vane and is extended to project over the cable so that the vane may rest thereon when in a horizontal position.

This arrangement of vanes, cables and pulleys forms a motor adapted to utilize the force of the wind and is mounted upon a frame 17, adapted to be automatically turned by the wind into the most effective position by means of a rudder 18 rigidly sesured to the frame by brackets 19—19 secured jointly to the frame and the rudder; tension cables 20—21 connecting the outer portion of the rudder to the frame to aid in holding the rudder rigid relative to the frame.

The frame 17 may be of any suitable construction adapting it to support the motor and revolve about a central point but preferably comprises a plurality of obliquely disposed struts 21, here shown as being four in number and arranged in quadrilateral formation and joined by four horizontally disposed beams 22 upon which are mounted bearings 23 for the shafts 13—13'.

The lower end of each strut is fitted with a fork 24 to which is secured a horizontal roller 25 and a vertical roller 26. A circular track 27 carried on ties 28, is provided for supporting the frame, the track being formed with a recess 29 in which the horizontal roller rides to assist in supporting the weight of the frame and guiding it. The outer face of this track serves as a guide for the frame, the vertical rollers bearing against this face.

As a means for transmitting power from the motor the shaft 13' is fitted with a drive pulley 30 operatively connected to a driven pulley 31 by a belt 32. The driven pulley is mounted on a shaft 33 provided with a bevel gear 34 which is disposed at right angles to and meshes with a similar gear 34' fixed to and adapted to revolve a vertically disposed power shaft 35 which in turn is geared to a horizontally disposed power shaft 36.

The frame is further supported by a structure 37 formed of four obliquely extending struts 38 supporting a bearing 39, which is adapted to take up vertical and annular thrust and which is here shown as comprising a ball retaining member 40, and a collar 41, which rolls upon a plurality of balls 42. This collar assists in supporting the tower by means of struts 43 and 44 arranged in a frame extending upward to engage the beams 22, so that the frame may revolve partially upon the thrust bearing and partially upon the circular rail, the thrust bearing being preferably designed and adjusted to take the major thrust of the weight of the tower. The shaft 35 extends through the collar 41 and is mounted centrally thereof, and concentric of the circular track 27, so that the frame will rotate around the shaft with the gear 34 traversing and constantly intermeshed with the gear 34'.

The rudder 18, is normally positioned at an angle to the direction of movement of the cables 10—11 so that the wind acting to maintain the rudder in the direction taken by the wind to dispose the vanes at an obtuse angle thereto to provide greater efficiency, turns the frame upon the thrust bearing.

Inasmuch as the torque of the power shaft would tend to counteract the force of the wind against the rudder when the wind tends to turn the frame in a direction opposed to the direction of rotation of the power shaft; a clutch 45 of the usual cone type is interposed between the driven pulley 31 and the bevel gear 34. This clutch is operatively connected to another rudder 46, disposed at a slight angle to the main rudder, by means of a bellcrank 47 and a rod 48, so that should the frame tend to resist the action of the rudder 18 the wind will act on the rudder 46 to release the clutch and allow the motor to idle until the frame has assumed the correct position whereupon the wind acting upon this rudder to hold the clutch released, the clutch again operatively connects the motor to the power shaft. The clutch 45 is here shown as embodying a member $a$ fixed on the shaft 33, and a member $b$ having a groove tube $c$ engaged by a yoke $d$ on the bell crank 47; the clutch member $b$ being normally held in frictional engagement with the clutch member $a$ by spring $e$, as is common in clutch construction.

The operation of the current motor is as follows: The rudder as explained, is adjusted to hold the motor so that the vanes are disposed at an obtuse angle to the direction of the wind. The air currents impinge against these vanes and their kinetic energy is imparted to the vanes which travel forward thus driving the motor. The air currents are deflected from the vane at substantially the angle of the vanes and new air is continually coming in contact with the vanes. The advantages accruing from disposing the vane at an obtuse angle to the wind are well known. All of the vanes depending downward from the cable are simultaneously acted upon by the wind as clearly shown in Figure 1, the direction of the wind to the vanes being indicated by the arrows. As a result all depending vanes are receiving the kinetic energy of the air passing across it and inasmuch as the vanes are disposed at an obtuse angle to the wind the velocity of the air is gradually reduced so that it issues from the opposite side of the vane at a greatly reduced velocity; the difference in velocity representing the amount of kinetic energy imparted to the vanes.

This action of the wind on the dependent vane causes the cables to advance around the pulleys to rotate the shaft 13'; the vanes being carried around the rear pulleys 12' and caused to lie flat upon the upper leaf of the cables so that the wind does not act upon the vanes as they advance toward the forward pulleys 12. The vanes will be maintained in their horizontal position on the cables by the projecting ends of the bar 15' seating on the cables shown in Figure 3. As these vanes pass over the forward pulleys 12 and descend the projecting ends of the transverse bars 15' on the vanes fall forward on arcuate guides 49 which extend beneath the pulleys 12 and serve to maintain the vanes in substantially a horizontal position until the pivotal mountings of the vanes have advanced a short distance with the lower leaves of the cables until the bars pass over the lower ends of the guides so that the vanes will be caused to suddenly change from the horizontal to the vertical dependent position. As a means for limiting the rocking movement of the vanes and maintaining them in substantially a vertical position, a chain 50 is connected to each side of a vane and to the cable a short distance from the pivotal mounting of the vane. As the vanes pass over the forward pulley 12 and descend, the transverse bars 15' on the vanes fall forward upon guides 49 and is thereby prevented from reversing to the vertical position too suddenly.

As the vanes drive the cables to rotate the power shaft 13', the frame will tend to revolve but will be held substantially stationary by the rudder. Should the wind change so as to act upon the rudder at an angle the pressure exerted will tend to turn it from the correct position. Should the frame, however, be prevented from turning the wind will act upon the rear rudder 46 causing it to act upon the bell crank 47, through the rod 48 to release the clutch, allowing the motor to idle and leaving the frame free to turn.

The current motor in the embodiment shown and described is particularly adapted for developing power from air currents but by modification of the construction it may be applied for developing power from water currents such as streams and rivers, and may also be employed for developing power from waves, and by reversal of the motion of the vanes may be employed for the propulsion of vessels and vehicles against water or air, the feature of the invention which adapts it to all such purposes being the arrangement and disposition of the vanes relative to the direction of the flow of the curent or action of the waves.

In adapting the invention for use in streams, the construction and arrangement of the vanes shown in Figure 6 is employed; the vanes 51 being rigidly mounted on arms 52 pivoted on the cables 53 passing over pulleys 54. The vanes are provided with projecting lugs 55 to support them upon the cables when positioned on the upper side of the motor which are adapted to engage guides 56 arranged adjacent each end of the motor.

The operation of the motor shown in Figure 6 is as follows; The motor is fixed in a stream by suitable means not shown and is disposed at an angle to the current so that the vanes are disposed at an obtuse angle to the flow of water. The flowing water acts on the vanes to drive the cables around to develop power. The impart of the water against the vanes holds them disposed vertically as shown. As each vane rides forward the lugs ride upon the guard and gradually reverses the vanes until they assume the position shown at the upper side of the motor. Similarly the other guard gradually guides and reverses the vane so that it is introduced to the water in a vertical position to prevent drag. The motor may be employed in reverse action as a propeller for vessels.

While I have shown and described a specific embodiment of my invention I do not limit myself to the exact details of construction shown, but may employ such other changes and modifications as occasion may require, coming within the scope of the appended claims, without departing from the spirit of the invention.

I claim:

1. In a current motor an endless conveyor, a plurality of vanes carried by said conveyor, means for holding said vanes at an angle to the current whereby the current acts upon all depending vanes simultaneously, a driven shaft operatively connected to said conveyor, and current actuated means for temporarily disconnecting said conveyor operatively from said shaft.

2. In a current motor an endless conveyor, a plurality of vanes carried by said conveyor means for holding said vanes at an obtuse angle to the current, a driven shaft operatively connected to said conveyor, and current actuated means for temporarily disconnecting said conveyor operatively from said shaft.

3. In a current motor, a frame pivotally mounted to turn with a change of direction of the current, a shaft mounted adjacent each side of the frame, a pair of pulleys fixed to each shaft, a pair of cables operatively connecting said pulleys, a rudder fixed to said frame, a thrust bearing disposed centrally to said frame and adapted to serve as a pivot for said frame, a driven pulley operatively connected to one of the said shafts, a power shaft, a clutch between said power shaft and said driven pulley, and a clutch operating rudder adapted to release said clutch.

4. In a current motor, a frame pivotally mounted to turn with a change of direction of the current; said frame comprising a plurality of struts; rollers on said struts, a circular track for said rollers, an endless conveyor mounted on said frame comprising a plurality of pulley and cables, vanes pivotally mounted upon said cables and adapted to be disposed in a vertical position when on the lower side of said conveyor and further adapted to assume a horizontal position when carried to the upper side of said conveyor, a guard adapted to cause said vanes to suddenly change from a horizontal to a vertical position, a driven pulley operatively connected to said conveyor, a power shaft, a clutch between said power shaft and said driven pulley and a clutch releasing rudder.

AUGUST GRETH.